(12) United States Patent
Aoki

(10) Patent No.: US 9,499,162 B2
(45) Date of Patent: Nov. 22, 2016

(54) HYBRID VEHICLE

(71) Applicant: Toyota Jidosha Kabushiki Kaisha, Toyota-shi, Aichi-ken (JP)

(72) Inventor: Kazuma Aoki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/848,925

(22) Filed: Sep. 9, 2015

(65) Prior Publication Data

US 2016/0082826 A1 Mar. 24, 2016

(30) Foreign Application Priority Data

Sep. 18, 2014 (JP) .................................. 2014-190147

(51) Int. Cl.
| | |
|---|---|
| *B60W 10/06* | (2006.01) |
| *B60W 10/08* | (2006.01) |
| *B60W 20/00* | (2016.01) |
| *B60L 15/20* | (2006.01) |
| *B60L 11/18* | (2006.01) |
| *B60K 6/445* | (2007.10) |

(52) U.S. Cl.
CPC .............. *B60W 20/20* (2013.01); *B60K 6/445* (2013.01); *B60L 11/1809* (2013.01); *B60W 10/06* (2013.01); *Y10S 903/93* (2013.01)

(58) Field of Classification Search
CPC .... B60W 10/06; B60W 10/08; B60W 20/13; B60W 20/20; B60W 2510/244; B60W 2540/10; B60W 30/182; B60L 15/2045; B60L 2240/423; B60L 2240/443; B60L 2240/547

See application file for complete search history.

(56) References Cited

U.S. PATENT DOCUMENTS

| | | | |
|---|---|---|---|
| 2014/0163793 A1* | 6/2014 | Kim ..................... | B60W 20/10 701/22 |
| 2014/0207324 A1* | 7/2014 | Murakami ............... | B60K 6/48 701/22 |
| 2014/0210216 A1* | 7/2014 | Konishi ................... | B60K 6/48 290/38 R |

FOREIGN PATENT DOCUMENTS

JP 2009-210045 A 9/2009

* cited by examiner

*Primary Examiner* — Bryan Evans
(74) *Attorney, Agent, or Firm* — Dinsmore & Shohl LLP

(57) ABSTRACT

During acceleration in accordance with an operation of an accelerator pedal in HV traveling, an ECU performs engine rotation speed control for increasing an engine rotation speed in accordance with acceleration of a vehicle, by increasing discharge power of a power storage device to increase driving force of a motor generator and suppressing an output from an engine. The discharge power of the power storage device at the time when performing engine rotation speed control in a CD mode is greater than the discharge power at the time when performing engine rotation speed control in a CS mode.

8 Claims, 4 Drawing Sheets

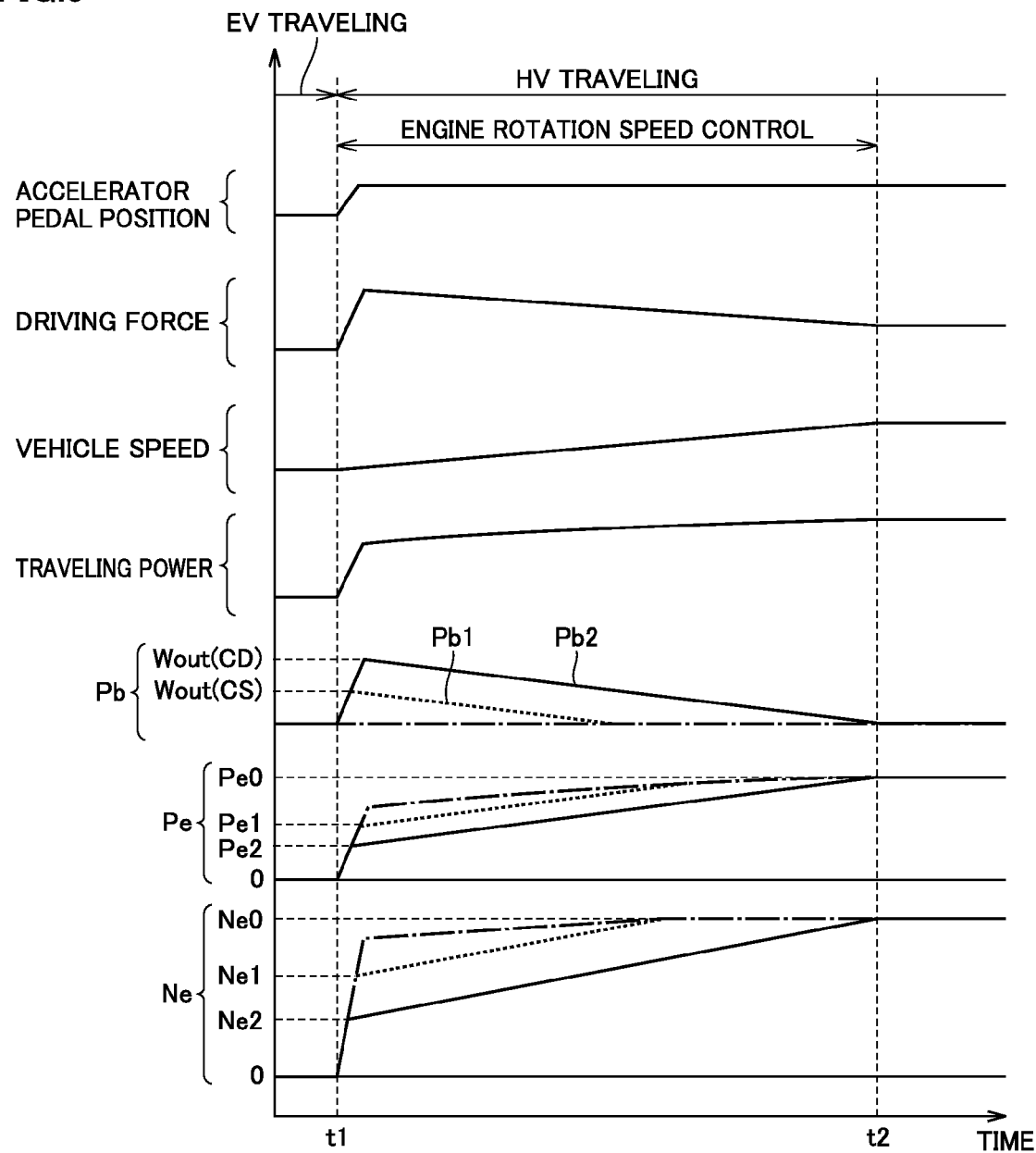

HYBRID VEHICLE

This nonprovisional application is based on Japanese Patent Application No. 2014-190147 filed on Sep. 18, 2014, with the Japan Patent Office, the entire contents of which are hereby incorporated by reference.

BACKGROUND OF THE INVENTION

Field of the Invention

The present invention relates to a hybrid vehicle, and particularly to a hybrid vehicle including an internal combustion engine, a power storage device, and an electric motor that receives electric power from the power storage device to generate vehicle driving force.

Description of the Background Art

In the hybrid vehicle as described above, a driver may feel strangeness with acceleration because the vehicle speed and the rotation speed of the internal combustion engine are increased not in a proportionally-cooperative manner during acceleration. In order to solve such a problem, for example, Japanese Patent Laying-Open No. 2009-210045 discloses that, during acceleration of a vehicle, the target rotation speed of the internal combustion engine is set such that the sound pressure of the internal combustion engine is proportionally increased relative to the vehicle speed increase.

When performing rotation speed control of the internal combustion engine disclosed in Japanese Patent Laying-Open No. 2009-210045, the target rotation speed of the internal combustion engine is set such that the sound pressure of the internal combustion engine is proportionally increased relative to the vehicle speed increase, which causes shortage of traveling power, which is replenished by means of an electric motor that receives electric power from the power storage device to generate vehicle driving force. When the power replenished by means of the electric motor during execution of rotation speed control of the internal combustion engine is permitted up to a relatively large value, the flexibility to set the rotation speed of the internal combustion engine is increased, thereby increasing the possibility that a desired sound pressure increase (rotation speed increase) can be realized. However, the operating point of the internal combustion engine greatly deviates from a region in which the internal combustion engine efficiently operates, so that the fuel efficiency of the internal combustion engine may deteriorate.

However, in the case where the rotation speed control of the internal combustion engine as described above is applied to a hybrid vehicle that can travel while selecting one of a CD (Charge Depleting) mode and a CS (Charge Sustaining) mode, there may be room for improvement in fuel efficiency, which is however not particularly taken into consideration in Japanese Patent Laying-Open No. 2009-210045.

SUMMARY OF THE INVENTION

The present invention has been made to solve the above-described problems. An object of the present invention is to improve fuel efficiency, for a hybrid vehicle capable of traveling while selecting one of a CD mode and a CS mode, at the time when performing rotation speed control for increasing the rotation speed of the internal combustion engine in accordance with acceleration.

According to the present invention, a hybrid vehicle includes an internal combustion engine, a power storage device, an electric motor that receives electric power from the power storage device to generate vehicle driving force, and a control device. The control device performs control for causing the vehicle to travel while selecting one of a CD mode and a CS mode, and selecting one of EV traveling and HV traveling in accordance with a traveling condition in each of the CD mode and the CS mode. In EV traveling, the vehicle travels by the electric motor while stopping the internal combustion engine. In HV traveling, the vehicle travels while operating the internal combustion engine. Furthermore, during acceleration in accordance with an operation of an accelerator pedal in HV traveling, the control device performs rotation speed control for increasing rotation speed of the internal combustion engine in accordance with acceleration of the vehicle, by increasing discharge power of the power storage device to increase driving force of the electric motor and suppressing an output of the internal combustion engine. In this case, the discharge power of the power storage device at a time when performing the rotation speed control in the CD mode is greater than the discharge power at the time when performing the rotation speed control in the CS mode.

When the discharge power of the power storage device at the time when performing the above-described rotation speed control in the CS mode is increased, the fuel efficiency of the internal combustion engine deteriorates as described above, and also, the discharge power may be limited by contraries by a decrease in an SOC (State Of Charge) of the power storage device. On the other hand, in the CD mode, basically, the fuel efficiency is improved by actively using the electric power stored in the power storage device for vehicle traveling. Even if the fuel efficiency of the internal combustion engine deteriorates, the electric power stored in the power storage device is actively consumed, so that the total fuel efficiency may be improved. In this hybrid vehicle, the discharge power of the power storage device at the time when performing the above-described rotation speed control in the CD mode is set to be greater than the discharge power at the time when performing the rotation speed control in the CS mode. Thereby, deterioration in fuel efficiency of the internal combustion engine and a decrease in SOC of the power storage device are suppressed in the CS mode while the electric power stored in the power storage device is actively consumed in the CD mode, so that the total fuel efficiency is improved. Therefore, this hybrid vehicle allows an improvement in fuel efficiency at the time when performing rotation speed control for increasing the rotation speed of the internal combustion engine in accordance with acceleration.

Preferably, discharge allowable power (Wout) of the power storage device at the time when performing the rotation speed control in the CD mode is greater than the discharge allowable power at the time when performing the rotation speed control in the CS mode.

By such a configuration, the discharge power of the power storage device at the time when performing the rotation speed control in the CD mode can be set to be greater than the discharge power at the time when performing the rotation speed control in the CS mode. Therefore, this hybrid vehicle allows an improvement in fuel efficiency at the time when performing the above-described rotation speed control.

Preferably, the control device performs the rotation speed control when the internal combustion engine is started during acceleration in accordance with the operation of the accelerator pedal.

By such a configuration, when the internal combustion engine is started during acceleration in accordance with the operation of the accelerator pedal, the rotation speed of the internal combustion engine can be increased in accordance with acceleration without significantly impairing the fuel efficiency.

Preferably, the hybrid vehicle further includes a charging device configured to receive electric power from a power supply external to the vehicle to charge the power storage device.

According to this hybrid vehicle, the electric power supplied from the power supply external to the vehicle is actively used, thereby allowing a sufficient improvement in fuel efficiency at the time when performing the above-described rotation speed control.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a time chart showing behaviors of various representative physical quantities during execution of engine rotation speed control.

DESCRIPTION OF THE PREFERRED EMBODIMENTS

Figure 1:
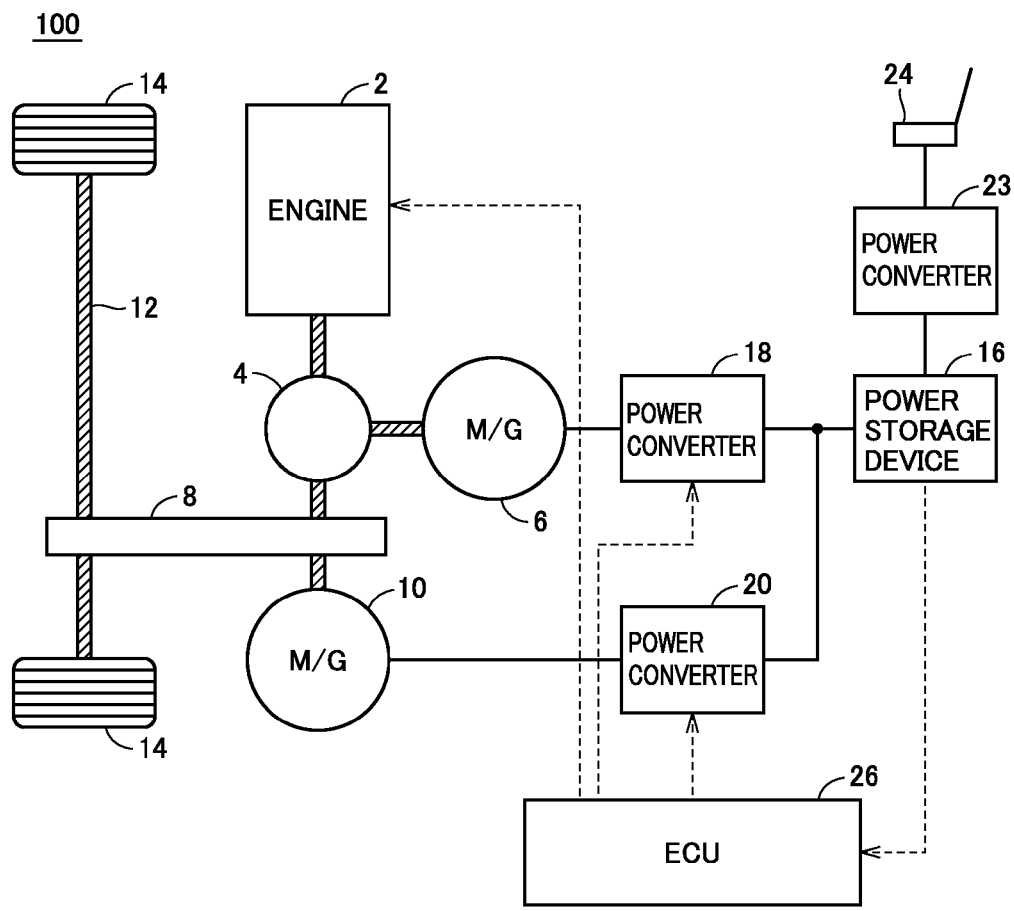
FIG. 1 is a block diagram for illustrating the entire configuration of a hybrid vehicle according to an embodiment of the present invention.

The embodiments of the present invention will be hereinafter described in detail with reference to the accompanying drawings, in which the same or corresponding components are designated by the same reference characters, and description thereof will not be repeated.

FIG. 1 is a block diagram for illustrating the entire configuration of a hybrid vehicle according to an embodiment of the present invention. Referring to FIG. 1, a hybrid vehicle 100 includes an engine 2, a power split device 4, motor generators 6 and 10, a transmission gear 8, a drive shaft 12, and a wheel 14. Furthermore, hybrid vehicle 100 further includes a power storage device 16, power converters 18, 20, and 23, a connection unit 24, and an ECU (Electronic Control Unit) 26.

Engine 2 is an internal combustion engine that outputs motive power by converting thermal energy produced by combustion of fuel into kinetic energy of a motion element such as a piston and a rotor. Examples of fuel for engine 2 may be suitably hydrocarbon-based fuel such as gasoline, light oil, ethanol, liquid hydrogen and natural gas, or liquid or gaseous hydrogen fuel.

Motor generators 6 and 10 each are an alternating-current (AC) rotating electric machine, and, for example, formed of a three-phase AC synchronous motor. Motor generator 6 is used as a power generator driven by engine 2 via power split device 4 and also used as an electric motor for starting engine 2. Motor generator 10 mainly operates as an electric motor and drives drive shaft 12. On the other hand, when the vehicle's brake is applied or when acceleration is slowed down while the vehicle is traveling downhill, motor generator 10 operates as a power generator to perform regenerative power generation.

Power split device 4 includes a planetary gear mechanism having three rotation shafts including a sun gear, a carrier, and a ring gear, for example. Power split device 4 divides the driving force of engine 2 into motive power transmitted to the rotation shaft of motor generator 6 and motive power transmitted to transmission gear 8. Transmission gear 8 is coupled to drive shaft 12 for driving wheel 14. Furthermore, transmission gear 8 is coupled also to the rotation shaft of motor generator 10.

Power storage device 16 is a rechargeable direct-current (DC) power supply, which is, for example, formed of a secondary battery such as a nickel-metal hydride or lithium-ion secondary battery. Power storage device 16 supplies electric power to power converters 18 and 20. Furthermore, when receiving electric power generated during power generation of motor generator 6 and/or 10, power storage device 16 is charged. Furthermore, in the case where power storage device 16 is charged by the power supply (not shown) located external to the vehicle and electrically connected to connection unit 24, this power storage device 16 is charged by receiving electric power supplied from the power supply external to the vehicle (hereinafter, a power supply located external to the vehicle and electrically connected to connection unit 24 will also be referred to as an "external power supply", and charging of power storage device 16 by the external power supply will also be referred to as "external charging"). It is to be noted that a large capacity capacitor can also be employed as power storage device 16.

The state of charge of power storage device 16 is shown by an SOC expressed in percentage of the current power storage amount relative to the fully-charged state of power storage device 16. The SOC is calculated, for example, based on the output voltage and/or the input/output current of power storage device 16 that are detected by a voltage sensor and/or a current sensor that are not shown. The SOC may be calculated by an ECU separately provided in power storage device 16, or may be calculated by an ECU 26 based on the detected value of the output voltage and/or the input/output current of power storage device 16.

Based on the control signal received from ECU 26, power converter 18 performs a bidirectional DC/AC power conversion between motor generator 6 and power storage device 16. Similarly, based on the control signal received from ECU 26, power converter 20 performs a bidirectional DC/AC power conversion between motor generator 10 and power storage device 16. Thereby, motor generators 6 and 10 can output a positive torque used for operating as an electric motor or a negative torque used for operating as a power generator, while transmitting and receiving electric power to and from power storage device 16. In addition, a boost converter for a DC voltage conversion can be arranged between power storage device 16 and each of power converters 18 and 20.

During external charging by the external power supply, based on the control signal received from ECU 26, power converter 23 converts electric power, which is supplied from the external power supply through connection unit 24, into a voltage level of power storage device 16, and then, outputs the converted electric power to power storage device 16.

ECU 26 includes a CPU (Central Processing Unit), a storage device, and an input/output buffer and the like (each of which is not shown), and, based on inputs of signals from various sensors and operation inputs from a driver, outputs a signal for controlling each device in hybrid vehicle 100. It is to be noted that the above-described control is not limited to processing by software, but can be carried out by dedicated hardware (an electronic circuit).

As main control, ECU 26 calculates power required for vehicle traveling (which will be hereinafter also referred to as "traveling power") based on the accelerator pedal position in accordance with the operation of the accelerator pedal and the vehicle speed. Then, ECU 26 controls engine 2 and motor generators 6 and 10 such that hybrid vehicle 100 generates the calculated traveling power.

When the traveling power is relatively small, ECU 26 controls the vehicle to travel only with motor generator 10 while stopping engine 2 (EV raveling). When the traveling power becomes relatively large in accordance with the operation of the accelerator pedal, or the SOC of power storage device 16 decreases, ECU 26 controls the vehicle to travel while operating engine 2 (ETV traveling). During I-IV traveling, hybrid vehicle 100 travels using the driving force from engine 2 in addition to the driving force of motor generator 10 or in place of motor generator 10. The electric power generated by motor generator 6 in association with the operation of engine 2 is stored in power storage device 16 or directly supplied to motor generator 10.

Furthermore, ECU 26 controls traveling of the vehicle by selectively applying the CD mode in which the SOC is consumed and the CS mode in which the SOC is maintained to a prescribed level.

Figure 2:
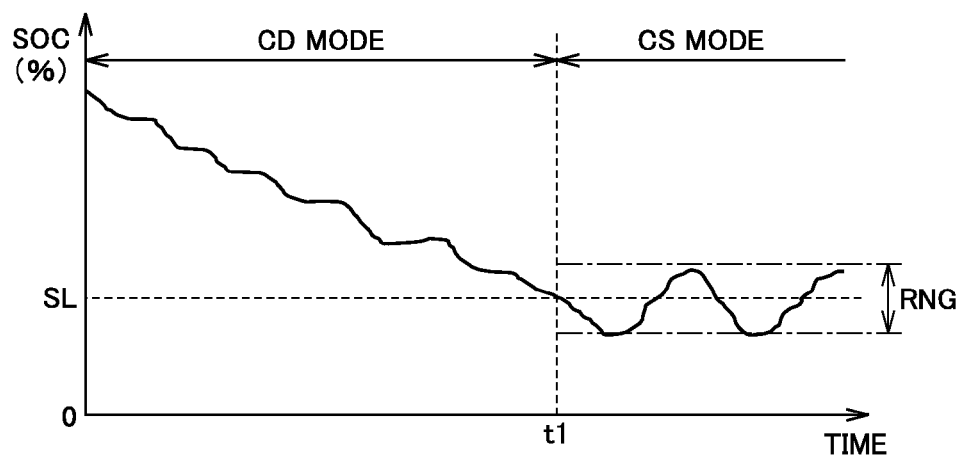
FIG. 2 is a diagram for illustrating a CD mode and a CS mode.

FIG. 2 is a diagram for illustrating the CD mode and the CS mode. Referring to FIG. 2, it is assumed that the vehicle is started to travel while selecting the CD mode, for example, after power storage device 16 is brought into a fully-charged state by external charging.

In the CD mode, the SOC is consumed,and basically, the electric power stored in power storage device 16 (electric energy mainly by external charging) is consumed. While the vehicle travels in the CD mode, the operation of engine 2 for maintaining the SOC is not carried out. Thereby, although the SOC increases temporarily by regenerative electric power recovered during deceleration and the like of the vehicle or by the electric power generated by operating engine 2 due to an increase in traveling power, the proportion of discharging is consequently relatively greater than that of charging. Thus, as a whole, the SOC decreases as the travelling distance increases.

In the CS mode, the SOC is maintained to a prescribed level. By way of example, at time t1, when the SOC decreases to a prescribed value SL showing a decrease of the SOC, the CS mode is selected. Then, the subsequent SOC is maintained within a control range RNG defined based on prescribed value SL. Specifically, engine 2 repeatedly starts and stops the operation as appropriate (intermittent operation), thereby controlling the SOC to fall within control range RNG. In this way, in the CS mode, engine 2 operates for maintaining the SOC.

Though not specifically shown, a switch that can be operated by a driver may be provided so as to allow switching between the CD mode and the CS mode in response to the driver's operation, irrespective of changes in the SOC.

According to this hybrid vehicle 100, EV traveling is selected when the sum of the traveling power and requested charge power (Pchg) for power storage device 16 is less than a prescribed engine starting threshold value. On the other hand, when the sum of the traveling power and the requested charge power exceeds the engine starting threshold value, HV traveling is selected by starting engine 2. Preferably, the engine starting threshold value in the CD mode is set to be higher than the engine starting threshold value in the CS mode.

In this way, also in the CD mode, engine 2 is started when the traveling power is increased in accordance with the driver's accelerator pedal operation and the like. When the traveling power decreases after engine 2 is started, engine 2 is stopped again.

On the other hand, starting of the engine for controlling the SOC is avoided in the CD mode. For example, in the CD mode, the requested charge power (Pchg) is set at 0. Also in the CD mode, even if the traveling power is relatively small, the operation of engine 2 may be permitted, for example, in the cases where hot water heating using engine 2 as a heat source is requested, where engine 2 is warmed up, and the like.

In the CS mode, the SOC is controlled by adjusting the output of engine 2 so as to keep the SOC to fall within control range RNG. For example, in the CS mode, starting of engine 2 is requested also in accordance with a decrease in the SOC in addition to the traveling power. On the other hand, also in the CS mode, engine 2 is stopped when the sum of the traveling power and the requested charge power is lower than the engine starting threshold value.

In this way, in hybrid vehicle 100, the CD mode is not limited to EV traveling in which the vehicle travels while continuously keeping engine 2 stopped, and the CS mode is also not limited to HV traveling in which the vehicle travels while continuously keeping engine 2 operating. EV traveling and HV traveling each can be carried out both in the CD mode and in the CS mode.

According to hybrid vehicle 100, basically, the frequency of EV traveling in the CD mode is increased to effectively utilize the electric energy stored in power storage device 16, thereby allowing an improvement in energy efficiency (fuel efficiency).

Again referring to FIG. 1, during acceleration in accordance with the operation of the accelerator pedal in HV traveling, ECU 26 further performs rotation speed control for increasing the rotation speed of engine 2 in accordance with acceleration of the vehicle (which will be hereinafter also referred to as "engine rotation speed control"), by temporarily increasing discharge power of power storage device 16 to increase the driving force of motor generator 10 and suppressing the output of engine 2. This rotation speed control may be generally performed during HV traveling. By referring to an example of start-up time of engine 2 during which this rotation speed control effectively functions, engine rotation speed control will be hereinafter described in detail.

Figure 3:
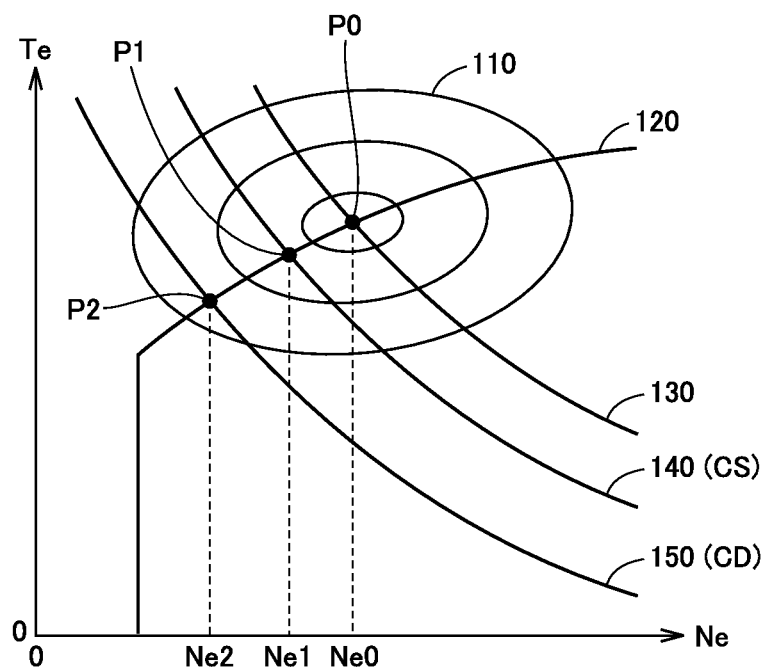
FIG. 3 is a diagram for illustrating an operating point of an engine.

FIG. 3 is a diagram for illustrating the operating point of engine 2. Referring to FIG. 3, the horizontal axis shows a rotation speed Ne of engine 2 while the vertical axis shows a torque Te of engine 2. The operating point of engine 2 is defined by a combination of rotation speed Ne and torque Te of engine 2.

An equivalent-fuel efficiency line 110 is a collection of operating points at which the fuel efficiency is the same. A plurality of equivalent-fuel efficiency lines show that the fuel efficiency is higher as being closer to the center of the circle (ellipse). A fuel-efficiency optimum operation line 120 is shown by a collection of operating points at which the fuel efficiency of engine 2 is maximized relative to the same engine power. Fuel-efficiency optimum operation line 120 can be determined uniquely in advance based on the experimental results and the like. Therefore, the fuel efficiency of engine 2 can be improved by setting the engine operating point on fuel-efficiency optimum operation line 120 relative to the change in engine power.

An equivalent-power line 130 is a collection of operating points of power equal to the engine power in the case where engine rotation speed control is not performed. Specifically, in the case where the engine rotation speed control is not performed, the engine power is set so as to cause equivalent-power line 130 to cross fuel-efficiency optimum operation line 120 in the vicinity of the center of equivalent-fuel efficiency line 110 in order to cause engine 2 to operate at an efficient operating point.

The following is the case where acceleration is requested by operating the accelerator pedal to increase the traveling power, thereby starting engine 2. In the case where engine rotation speed control is not performed, when engine 2 is started, the engine power is set at power shown by equivalent-power line 130. The operating point of engine 2 shifts to an operating point P0 indicated as a point of intersection with equivalent-power line 130 along fuel-efficiency optimum operation line 120.

However, this operating point P0 is set in consideration of the efficiency aspects of engine 2. Thus, when an engine rotation speed Ne is increased to a rotation speed Ne0 corresponding to operating point P0 after the engine is started, engine rotation speed Ne abruptly increases relative to the acceleration degree of the vehicle. Accordingly, this abrupt increase in engine rotation speed Ne does not match the driver's feeling.

Thus, in hybrid vehicle 100 according to the present first embodiment, during acceleration, the discharge power of power storage device 16 is temporarily increased to increase the driving force of motor generator 10, thereby suppressing the engine power during acceleration and suppressing an increase in engine rotation speed Ne, so that engine rotation speed Ne is increased in accordance with acceleration (engine rotation speed control).

In other words, in the case where engine rotation speed control is performed, the target rotation speed of engine 2 is set such that engine rotation speed Ne is proportionally increased relative to the vehicle speed increase, which causes shortage of traveling power, which is replenished by means of motor generator 10 that receives electric power from power storage device 16 to generate vehicle driving force. During execution of the engine rotation speed control, the discharge power of power storage device 16 is increased to thereby allow motor generator 10 to output power up to a relatively large value. Accordingly, the flexibility to set engine rotation speed Ne is increased, thereby increasing the possibility that a desired engine rotation speed Ne can be increased.

As the discharge power of power storage device 16 is larger, the engine power can be more suppressed, so that the flexibility to control the engine rotation speed is improved. However, when the engine power is suppressed, the operating point of engine 2 deviates from P0. Accordingly, the fuel efficiency of engine 2 deteriorates. Furthermore, when the SOC greatly decreases due to an increase in the discharge power, the discharge power may be limited by contraries. Therefore, in consideration of the circumstances as described above, it is desirable that the discharge power of power storage device 16 is not so increased. Thus, in the CS mode, for example, the discharge power of power storage device 16 is set to such an extent that the engine power becomes equal to the power shown by an equivalent-power line 140 (FIG. 3).

On the other hand, in the CD mode, basically, the fuel efficiency is improved by causing the vehicle to travel actively using the electric power stored in power storage device 16. Even if the fuel efficiency of engine 2 deteriorates, the total fuel efficiency may be improved by actively consuming the electric power stored in power storage device 16. In other words, it can be said that the allowable range of fuel-efficiency deterioration of engine 2 is greater in the CD mode than in the CS mode.

Thus, in hybrid vehicle 100 according to the present first embodiment, the discharge power of power storage device 16 at the time when performing engine rotation speed control in the CD mode is set at a value larger than that of the discharge power at the time when performing engine rotation speed control in the CS mode. In other words, in the CD mode, for example, the discharge power of power storage device 16 is set to such an extent that the engine power becomes equal to the power shown by an equivalent-power line 150 (FIG. 3). Accordingly, when the engine rotation speed control is performed, fuel efficiency deterioration of engine 2 is suppressed in the CS mode and the electric power stored in power storage device 16 is actively consumed in the CD mode, so that the total fuel efficiency is improved.

Figure 4:
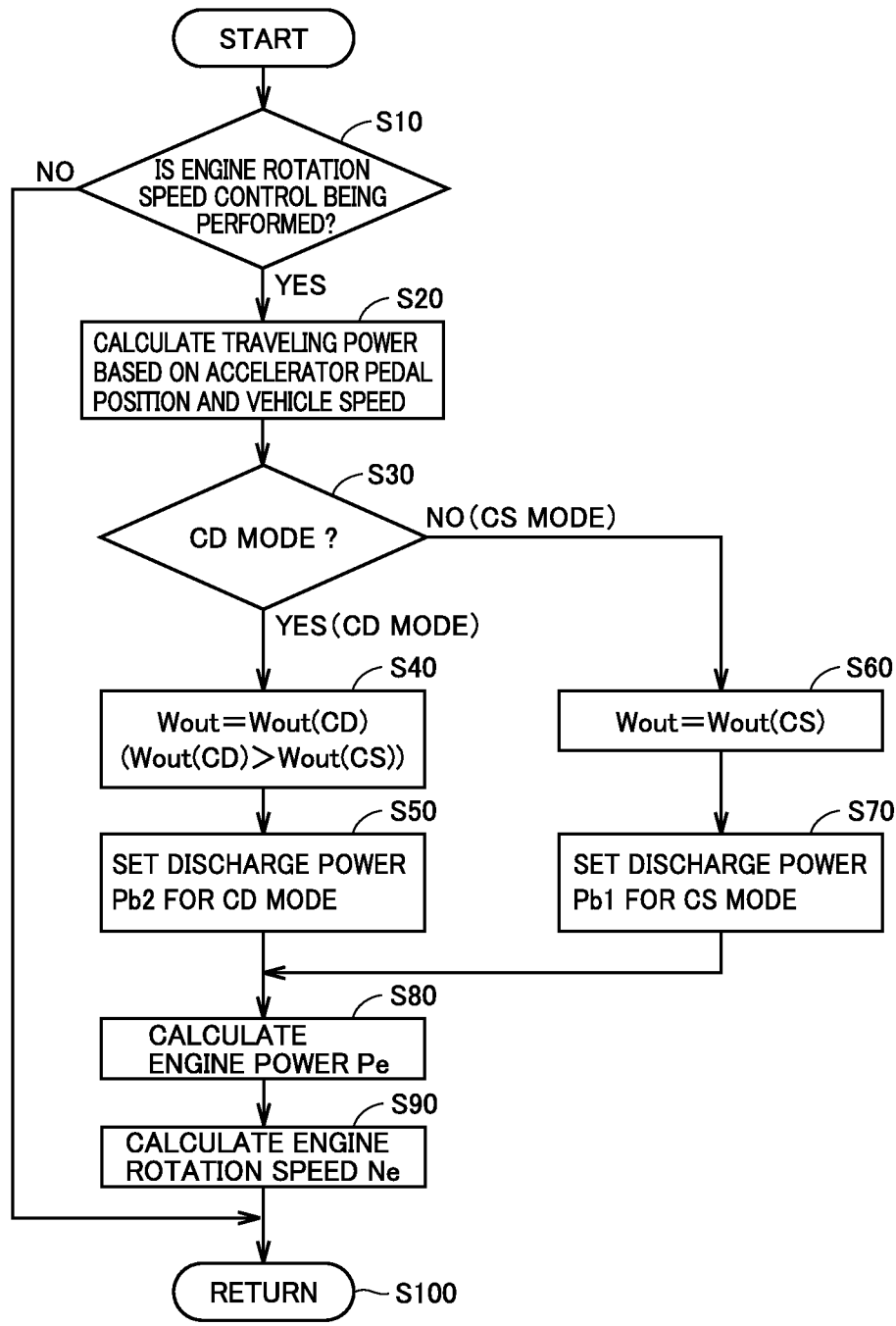
FIG. 4 is a flowchart illustrating the processing procedure of engine rotation speed control by an ECU.

FIG. 4 is a flowchart illustrating the processing procedure of engine rotation speed control by ECU 26. The process shown in this flowchart is performed as it is called from a main routine and executed at every prescribed time or every time predetermined conditions are satisfied.

Referring to FIG. 4, ECU 26 determines whether engine rotation speed control is being performed or not (step S10). Specifically, when HV traveling is selected and acceleration is taking place in accordance with the operation of the accelerator pedal, it is determined that the engine rotation speed control is being performed. When it is determined that the engine rotation speed control is not being performed (NO in step S10), ECU 26 proceeds with the process to step S100 without performing a series of subsequent processes.

When it is determined in step S10 that the engine rotation speed control is being performed (YES in step S10), ECU 26 calculates traveling power based on the accelerator pedal position and the vehicle speed (step S20). As an example, by using a map prepared in advance and showing the relation between the traveling power and each of the accelerator pedal position and the vehicle speed, the traveling power is calculated based on the accelerator pedal position and the vehicle speed.

Then, ECU 26 determines whether the CD mode is selected or not (step S30). When it is determined that the CD mode is selected (YES in step S30), ECU 26 sets discharge allowable power Wout (CD) for CD mode as discharge allowable power Wout of power storage device 16 (step S40). This discharge allowable power Wout (CD) is greater than discharge allowable power Wout at the time when not performing the rotation speed control, and further greater than discharge allowable power Wout (CS) for CS mode which will be described later. Thereby, the discharge power of power storage device 16 at the time when performing the rotation speed control in the CD mode can be set to be greater than the discharge power at the time when performing the rotation speed control in the CS mode.

Then, ECU 26 sets discharge power Pb2 for CD mode such that discharge allowable power Wout (CD) is defined as an upper limit (step S50). This discharge power Pb2 for CD mode is set to be greater than discharge power Pb1 for CS mode which will be described later. It is to be noted that discharge power Pb2 is set, for example, using a map and the like that are prepared in advance.

On the other hand, when it is determined in step S30 that the CS mode is selected (NO in step S30), ECU 26 sets discharge allowable power Wout (CS) for CS mode as discharge allowable power Wout (step S60). This discharge allowable power Wout (CS) is greater than discharge allowable power Wout at the time when not performing the rotation speed control, but less than discharge allowable power Wout (CD) for CD mode described above.

Then, ECU 26 sets discharge power Pb1 for CS mode such that discharge allowable power Wout (CS) is defined as an upper limit (step S70). This discharge power Pb1 for CS mode is set at a value smaller than discharge power Pb2 for CD mode described above. It is to be noted that discharge power Pb1 is also set, for example, using a map and the like that are prepared in advance.

Then, ECU 26 calculates engine power Pe by subtracting discharge power Pb2 calculated in step S50 or discharge power Pb1 calculated in step S70 from the traveling power (step S80). In addition, since discharge power Pb2 for CD mode is greater than discharge power Pb1 for CS mode, engine power Pe in the CD mode (Pe2) shows a value smaller than that of engine power Pe in the CS mode (Pe1) on the same traveling conditions.

Then, ECU 26 calculates engine rotation speed Ne based on the calculated engine power Pe (step S90). Specifically, engine rotation speed Ne is calculated based on the intersection of fuel-efficiency optimum operation line 120 shown in FIG. 3 and the equivalent-power line corresponding to the calculated engine power Pe.

FIG. 5 is a time chart showing an example of the behavior of each of various representative physical quantities during execution of engine rotation speed control. Referring to FIG. 5, in this time chart, an explanation will be given as an example with regard to the case where engine rotation speed control is performed upon start-up of engine 2 in the situation where acceleration is requested by the accelerator pedal operation to switch the traveling mode from EV traveling to HV traveling.

A solid line shows the behavior in the CD mode while a dotted line shows the behavior in the CS mode. A dashed and dotted line shows the behavior in the case where rotation speed control is not performed as a reference example. It is to be noted that a portion of a dotted line or a dashed and dotted line that overlaps with the solid line is not shown.

At time t1, EV traveling is switched to HV traveling, and then, engine 2 is started. In the CD mode (shown by a solid line), when engine 2 is started, the discharge allowable power of power storage device 16 is temporarily increased to Wout (CD), and discharge power Pb of power storage device 16 increases to Wout (CD). Thereby, the output of motor generator 10 increases, so that engine power Pe is suppressed to Pe1 and rotation speed Ne of engine 2 is suppressed to Ne1. Therefore, the subsequent rotation speed Ne of engine 2 can be increased in accordance with an increase in vehicle speed.

Also in the CS mode (shown by a dotted line), when engine 2 is started at time t1, discharge allowable power is temporarily increased to Wout (CS), and discharge power Pb increases to Wout (CS). Thereby, engine power Pe is suppressed to Pe2 and rotation speed Ne of engine 2 is suppressed to Ne2. Therefore, rotation speed Ne of engine 2 can be increased in accordance with an increase in vehicle speed, though not to the extent of the level achieved in the CD mode.

In the case where engine rotation speed control is not performed (shown by a dashed and dotted line), discharge power Pb is not temporarily increased even when engine 2 is started (requested charge power (Pchg) for power storage device 16 is assumed to be 0), but engine rotation speed Ne is immediately increased to around Net) after the engine is started. Therefore, rotation speed Ne of engine 2 cannot be increased in accordance with an increase in vehicle speed.

In addition, discharge allowable power Wout and discharge power Pb are increased temporarily. After discharge power Pb increases to Wout (CD) or Wout (CS), this discharge power Pb is gradually decreased by the increased amount thereof. Accordingly, engine rotation speed Ne increases to rotation speed Net) corresponding to operating point P0 (FIG. 3) at which engine 2 can be efficiently operated. In addition, the above-described behavior may be implemented by, with reference to a map and the like that are prepared in advance, controlling the power of motor generator 10 so as to gradually decrease discharge power Pb or gradually lowering the increased discharge allowable power Wout back to a value that has not been increased.

As described above, in the present embodiment, discharge power Pb of power storage device 16 at the time when performing the engine rotation speed control in the CD mode is set to be greater than discharge power Pb at the time when performing the rotation speed control in the CS mode. Thereby, deterioration in fuel efficiency of engine 2 and a decrease in SOC of power storage device 16 are suppressed in the CS mode while the electric power stored in power storage device 16 is actively consumed in the CD mode, so that the total fuel efficiency is improved. Therefore, according to the present embodiment, it becomes possible to improve the fuel efficiency at the time when performing rotation speed control for increasing the engine rotation speed in accordance with acceleration.

In the above-described embodiment, engine rotation speed control is defined to be performed when HV traveling is selected and acceleration is taking place in accordance with the operation of the accelerator pedal. However, engine rotation speed control may be performed only when engine 2 is started by the traveling power increased in response to acceleration requested by the operation of the accelerator pedal.

In addition, an explanation has been given in the above-described embodiments with regard to hybrid vehicle 100 (FIG. 1) having a configuration in which engine 2 and two motor generators 6 and 10 are coupled by power split device 4. The hybrid vehicle to which the present invention is applied is however not limited to such a configuration. For example, control that has been described in each of the above embodiments can also be applied to a hybrid vehicle and the like having a configuration in which engine 2 and one motor generator 10 are coupled in series through a clutch. Furthermore, the present invention can also be applied to a so-called series-type hybrid vehicle that uses engine 2 only for driving motor generator 6 to generate vehicle driving force only by motor generator 10.

Furthermore, in the above-described embodiments, hybrid vehicle 100 has been described as a so-called plug-in hybrid vehicle that is externally chargeable. The hybrid vehicle to which the present invention is applied is however not limited to a plug-in hybrid vehicle. In other words, the present invention can be applied also to a hybrid vehicle that does not include a charging device (power converter 23 and connection unit 24) serving to charge power storage device 16 by a power supply external to the vehicle.

In the above description, engine 2 corresponds to an embodiment of the "internal combustion engine" in the present invention, and motor generator 10 corresponds to an embodiment of the "electric motor" in the present invention.

Furthermore, ECU 26 corresponds to an embodiment of the "control device" in the present invention, and power converter 23 and connection unit 21 form an embodiment of the "charging device" in the present invention.

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A hybrid vehicle comprising:
   an internal combustion engine;
   a power storage device;
   an electric motor that receives electric power from said power storage device to generate vehicle driving force; and
   a control device configured to cause the vehicle to travel while selecting one of a CD (Charge Depleting) mode and a CS (Charge Sustaining) mode, and selecting one of EV traveling and HV traveling in accordance with a traveling condition in each of said CD mode and said CS mode, said EV traveling allowing the vehicle to travel by said electric motor while stopping said internal combustion engine, and said HV traveling allowing the vehicle to travel while operating said internal combustion engine,
   during acceleration in accordance with an operation of an accelerator pedal in said HV traveling, said control device performing rotation speed control for increasing a rotation speed of said internal combustion engine in accordance with acceleration of the vehicle, by increasing discharge power of said power storage device to increase driving force of said electric motor and suppressing an output of said internal combustion engine, and said discharge power at a time when performing said rotation speed control in said CD mode being greater than said discharge power at a time when performing said rotation speed control in said CS mode.

2. The hybrid vehicle according to claim 1, wherein discharge allowable power of said power storage device at the time when performing said rotation speed control in said CD mode is greater than said discharge allowable power at the time when performing said rotation speed control in said CS mode.

3. The hybrid vehicle according to claim 1, wherein said control device performs said rotation speed control when said internal combustion engine is started during acceleration in accordance with the operation of the accelerator pedal.

4. The hybrid vehicle according to claim 1, further comprising a charging device configured to receive electric power from a power supply external to the vehicle to charge said power storage device.

5. The hybrid vehicle according to claim 2, wherein said control device performs said rotation speed control when said internal combustion engine is started during acceleration in accordance with the operation of the accelerator pedal.

6. The hybrid vehicle according to claim 2, further comprising a charging device configured to receive electric power from a power supply external to the vehicle to charge said power storage device.

7. The hybrid vehicle according to claim 3, further comprising a charging device configured to receive electric power from a power supply external to the vehicle to charge said power storage device.

8. The hybrid vehicle according to claim 5, further comprising a charging device configured to receive electric power from a power supply external to the vehicle to charge said power storage device.

* * * * *

UNITED STATES PATENT AND TRADEMARK OFFICE
CERTIFICATE OF CORRECTION

| | |
|---|---|
| PATENT NO. | : 9,499,162 B2 |
| APPLICATION NO. | : 14/848925 |
| DATED | : November 22, 2016 |
| INVENTOR(S) | : Kazuma Aoki |

It is certified that error appears in the above-identified patent and that said Letters Patent is hereby corrected as shown below:

In the Specification

In Column 10, Line 3, after "increased to around", delete "Net)" and insert --Ne0--, therefor.

In Column 10, Line 11, after "increases to rotation speed", delete "Net)" and insert --Ne0--, therefor.

Signed and Sealed this
Twenty-eighth Day of March, 2017

Michelle K. Lee
*Director of the United States Patent and Trademark Office*